(12) United States Patent
Zhang

(10) Patent No.: US 7,414,866 B2
(45) Date of Patent: Aug. 19, 2008

(54) METHOD FOR SMOOTHING INPUT CURRENT TO A POWER DELIVERY SYSTEM HAVING REGENERATION CAPABILITY

(75) Inventor: Xuan Zhang, Monroeville, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 111 days.

(21) Appl. No.: 11/540,232

(22) Filed: Sep. 28, 2006

(65) Prior Publication Data

US 2008/0080213 A1    Apr. 3, 2008

(51) Int. Cl.
  H02M 1/12 (2006.01)
  H02M 1/14 (2006.01)
  H02M 7/00 (2006.01)
(52) U.S. Cl. .............................. 363/43; 363/40; 363/71
(58) Field of Classification Search .................... 363/43, 363/40, 65, 71, 72, 42, 95, 131
  See application file for complete search history.

(56) References Cited

U.S. PATENT DOCUMENTS

| | | | | | |
|---|---|---|---|---|---|
| 4,894,763 | A | * | 1/1990 | Ngo | ............................. 363/35 |
| 4,975,822 | A | * | 12/1990 | Lipman | ........................ 363/40 |
| 5,008,797 | A | * | 4/1991 | Patel et al. | ..................... 363/43 |
| 5,155,671 | A | * | 10/1992 | Inaba et al. | .................... 363/37 |
| 5,214,366 | A | * | 5/1993 | Hollmann | .................... 318/801 |
| 5,625,545 | A | | 4/1997 | Hammond | |
| 5,933,339 | A | * | 8/1999 | Duba et al. | ................... 363/71 |
| 5,986,909 | A | * | 11/1999 | Hammond et al. | ............ 363/65 |
| 6,014,323 | A | * | 1/2000 | Aiello et al. | ................... 363/71 |
| 6,301,130 | B1 | | 10/2001 | Aiello et al. | |

FOREIGN PATENT DOCUMENTS

| | | |
|---|---|---|
| WO | WO 94/10744 | 5/1994 |
| WO | WO 06/125184 | 11/2006 |

OTHER PUBLICATIONS

U.S. Appl. No. 11/419,064, filed May 18, 2006, Rastogi et al.
International Search Report dated Jun. 19, 2007 for Application No. PCT/US2007/014424.

* cited by examiner

*Primary Examiner*—Bao Q Vu

(57) ABSTRACT

A method for smoothing input current to a power delivery system having regeneration capability. The method comprises evaluating input current to an input converter of the power delivery system for a first fundamental cycle, and shifting a window relative to a waveform of an input voltage after the first fundamental cycle. The method also comprises evaluating input current to the input converter for a second fundamental cycle, and determining whether the input current of the second fundamental cycle is smoother than the input current of the first fundamental cycle. The method further comprises shifting the window in the same direction the window was shifted after the first fundamental cycle if the input current of the second fundamental cycle is smoother than the input current of the first fundamental cycle, and shifting the window in the opposite direction the window was shifted after the first fundamental cycle if the input current of the second fundamental cycle is not smoother than the input current of the first fundamental cycle.

19 Claims, 6 Drawing Sheets

METHOD FOR SMOOTHING INPUT CURRENT TO A POWER DELIVERY SYSTEM HAVING REGENERATION CAPABILITY

BACKGROUND

This application discloses an invention that is related, generally and in various embodiments, to a method for smoothing input current to a power delivery system having regeneration capability.

Power delivery systems such as AC motor drives are generally available as either a fully regenerative system or as a non-regenerative system. For non-regenerative systems, input power flows from an input power source to the load, and power produced by the load is blocked from flowing back to the input power source. In fully regenerative systems, input power flows from an input power source to the load, and the power produced by the load may flow back to the input power source.

It is known in the art for such fully regenerative systems to comprise an active front end to control regenerative current. However, active front ends may tend to cause some level of distortion of the incoming AC power. To reduce the distortion and smooth the input current on each leg of the AC input, it is also known to utilize line reactors on each leg of the AC input. However, the line reactors tend to be a relatively bulky and expensive solution to the distortion problem.

For many applications, only a portion of the power produced by the load is required for purposes of braking, etc. For such applications, a regenerative system generally provides much more regeneration capability than is required. Accordingly, most regenerative systems are not very cost-effective for applications which require limited regeneration capability.

To realize a drive with limited regeneration capability, it is known to configure a drive with a combination of regenerative and non-regenerative cells. For example, U.S. patent application Ser. No. 11/419,064 (the '064 application) discloses such a drive. The drive disclosed by the '064 application may be configured to have varying levels of regeneration capability by varying the number of regenerative versus non-regenerative cells in the drive, and each regenerative power cell may comprise an active front end that comprises switching devices controlled by pulse width modulation. Although the drive disclosed in the '064 application provides a cost-effective solution for applications requiring limited regeneration capability, any use of line reactors therewith to reduce any distortions caused by the active front end unnecessary adds to the size and cost of the system.

SUMMARY

In one general respect, this application discloses a method for smoothing input current to a power delivery system having regeneration capability. According to various embodiments, the method comprises evaluating input current to an input converter of the power delivery system for a first fundamental cycle, and shifting a window relative to a waveform of an input voltage after the first fundamental cycle. The method also comprises evaluating input current to the input converter for a second fundamental cycle, and determining whether the input current of the second fundamental cycle is smoother than the input current of the first fundamental cycle. The method further comprises shifting the window in the same direction the window was shifted after the first fundamental cycle if the input current of the second fundamental cycle is smoother than the input current of the first fundamental cycle, and shifting the window in the opposite direction the window was shifted after the first fundamental cycle if the input current of the second fundamental cycle is not smoother than the input current of the first fundamental cycle.

Aspects of the invention may be implemented by a computing device and/or a computer program stored on a computer-readable medium. The computer-readable medium may comprise a disk, a device, and/or a propagated signal.

BRIEF DESCRIPTION OF THE DRAWINGS

Various embodiments of the invention are described herein by way of example in conjunction with the following figures.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 1:
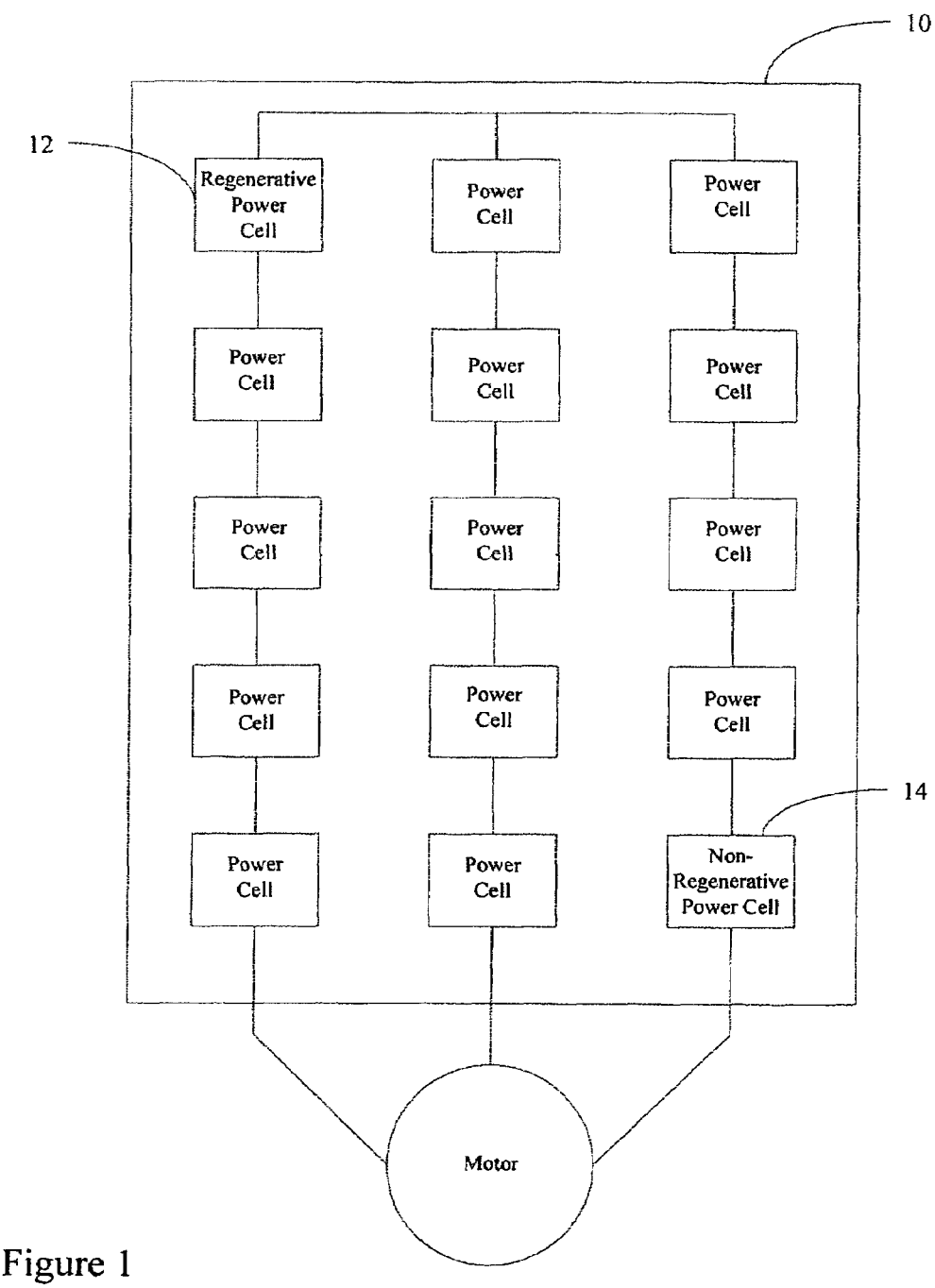
FIG. 1 illustrates various embodiments of a power delivery system.

FIG. 1 illustrates various embodiments of power delivery system 10. The power delivery system 10 may be a power delivery system having regeneration capability. The regenerative capability may be full or limited. For example, the power delivery system 10 may comprise a power delivery system as disclosed in the '064 application, which comprises at least one regenerative power cell 12 and at least one non-regenerative power cell 14. In FIG. 1, each power cell which is not identified as either a regenerative power cell or a non-regenerative power cell may be either. Each regenerative power cell 12 may be similar to one of the regenerative power cells disclosed in U.S. Pat. No. 6,301,130 (the '130 patent) to Aiello et al., and each of the non-regenerative power cells 14 may be similar to one of the non-regenerative power cells disclosed in U.S. Pat. No. 5,625,545 (the '545 patent) to Hammond. The contents of the '064 application, the '130 patent, and the '545 patent are hereby incorporated by reference in their entirety.

Figure 2:
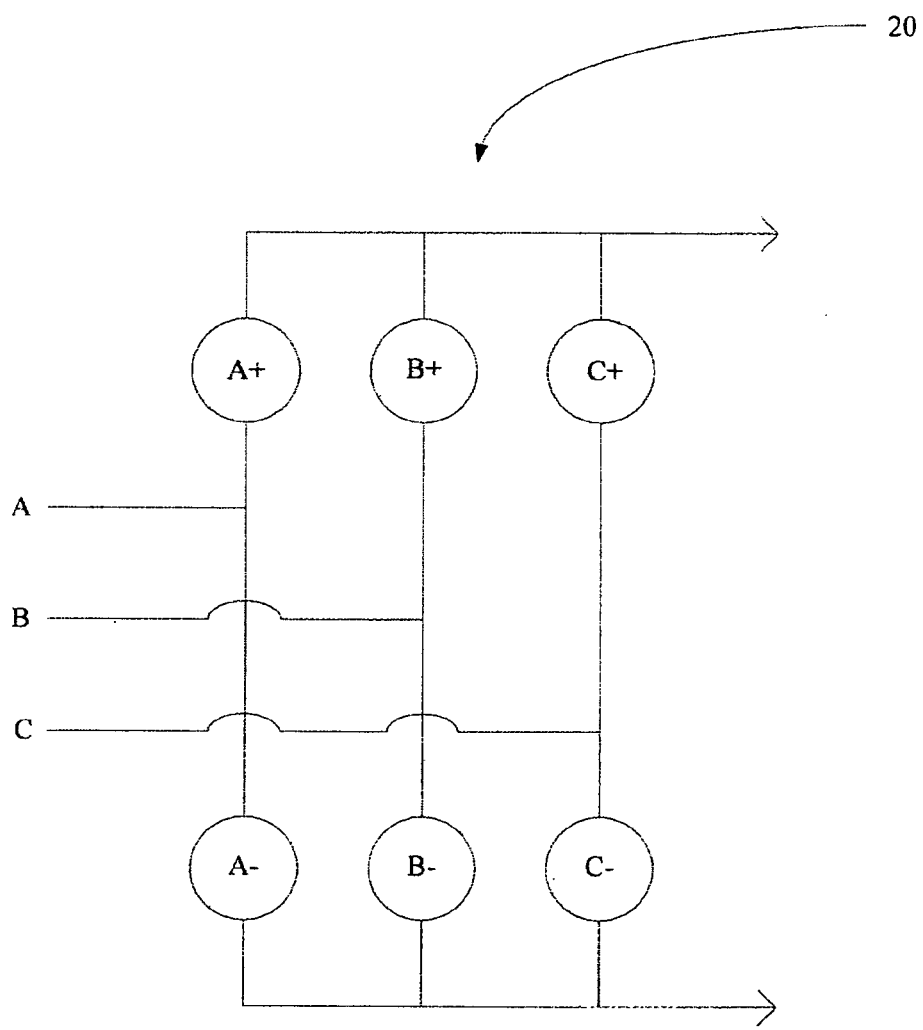
FIG. 2 illustrates various embodiments of a input converter of a power cell of the power delivery system of FIG. 1.
Figure 3:
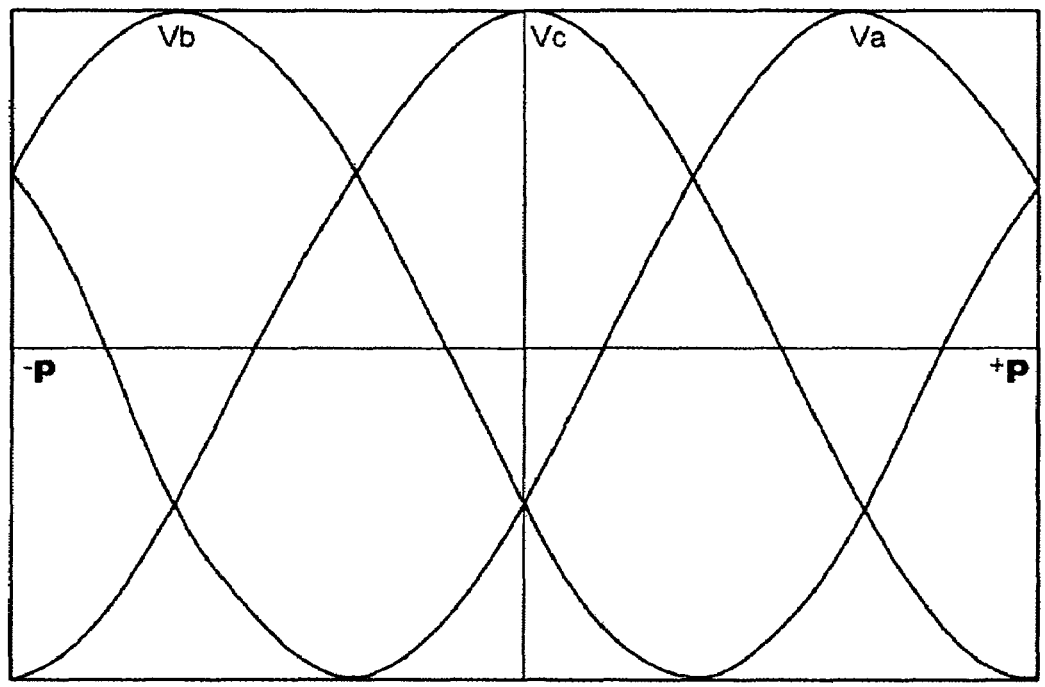
FIG. 3 illustrates exemplary line-to-neutral voltage waveforms received at the input converter of FIG. 2.
Figure 4:
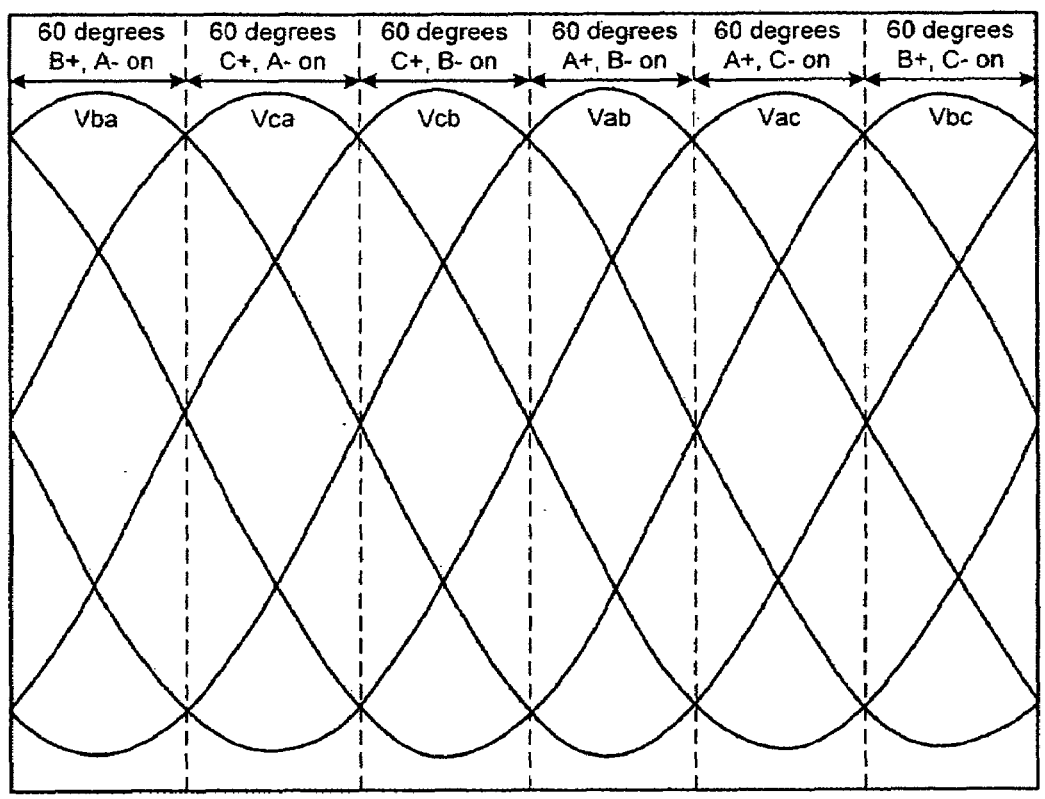
FIG. 4 illustrates exemplary line-to-line voltage waveforms received at the input converter of FIG. 2.

FIG. 2 illustrates an input converter 20 of regenerative power cell 12. The input converter 20 receives three-phase AC power, where the voltage waveforms are generally 120° offset in time as shown in FIG. 3. The three voltage waveforms may be designated as Va, Vb, and Vc. One skilled in the art will appreciate that there are six different line-to-line voltages present in such a system as shown in FIG. 4. The six line to line voltages may be designated as Vab, Vac, Vba, Vbc, Vca, and Vcb. During a given fundamental cycle, there are six instances when two of the line-to-line voltages have the same magnitude. Also, for each fundamental cycle, there are six separate 60° intervals, where for each respective interval, a different one of the line-to line voltages is greater in magnitude than the other line-to-line voltages. For example, the voltage Vab is greater in magnitude than the other line-to-line voltages in a given 60° interval, the voltage Vac is greater in magnitude than the other line-to-line voltages in the next 60° interval, the voltage Vbc is greater in magnitude than the other line-to-line voltages in the next 60° interval, etc. Collectively, the six separate 60° intervals may be referred to as a window.

The input converter 20 comprises switching devices A+, A−, B+, B−, C+ and C−. The switching devices may be embodied as insulated gate bipolar transistors (IGBTs), or any other suitable type of switching device. A first leg (phase A) of the three-phase AC power is connected to switching devices A+ and A−, a second leg (phase B) is connected to switching devices B+ and B−, and a third leg (phase C) is connected to switching devices C+ and C−. Collectively, switching devices A+, A−, B+, B−, C+ and C− form a bridge, where switching devices A+, B+ and C+ comprise the upper-half of the bridge and switching devices A−, B− and C− comprise the lower half of the bridge. The switching devices A+, A−, B+, B−, C+ and C− may be controlled by pulse width modulation (PWM) methods. According to various embodiments, the carrier frequency may be on the order of approximately 25 times the fundamental frequency. For example, for a fundamental frequency of 60 hertz, the carrier frequency may be on the order of approximately 1500 hertz.

At any given point in time, current flow through the input converter 20 is based on two of the three phases of the AC power, one of the switching devices of the upper half of the bridge, and one of the switching devices of the lower half of the bridge. Thus, only one of the switching devices in a given half-bridge conducts at a time. In general, switches A+ and B− may conduct when the line-to-line voltage Vab is greater than the other line-to-line voltages, switches A+ and C− may conduct when the line-to-line voltage Vac is greater than the other line-to-line voltages, switches B+ and C− may conduct when the line-to-line voltage Vbc is greater than the other line-to-line voltages, switches B+ and A− may conduct when the line-to-line voltage Vba is greater than the other line-to-line voltages, switches C+ and A− may conduct when the line-to-line voltage Vca is greater than the other line-to-line voltages, and switches C+ and B− may conduct when the line-to-line voltage Vbc is greater than the other line-to-line voltages.

Various methods for determining when a given line-to-line voltage is greater than the other line-to-line voltages are known in the art. For example, at a given point in time, the magnitude of the voltage Va may be determined based on the angle of voltage Va, where the angle of Va is a value between −180° and +180°. The control of the switches in the above-described manner is generally referred to as a six-step control method. Although known six-step control methods serve to control the rectification of the incoming AC power, they do not serve to smooth the input current delivered to the input converter 20.

Figure 5:
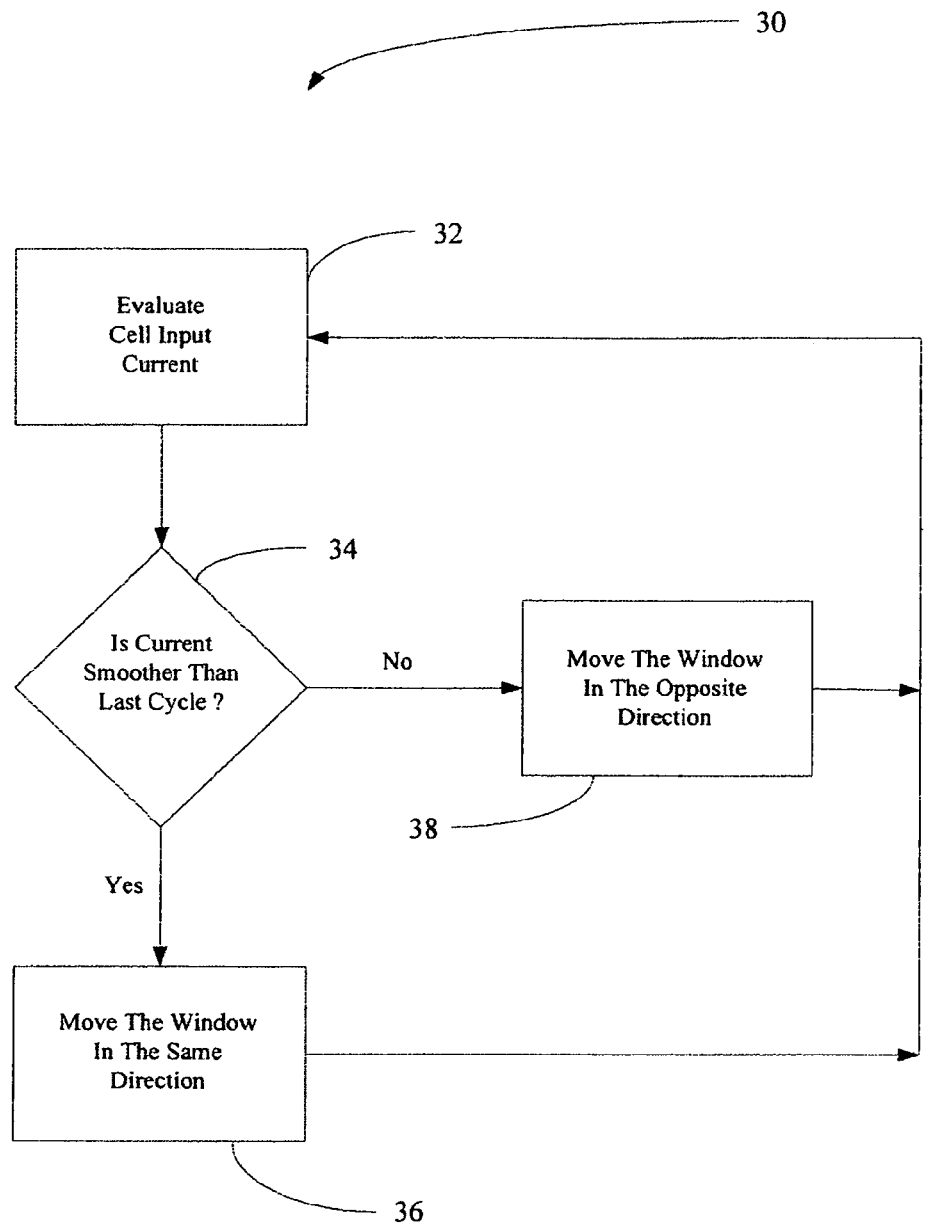
FIG. 5 illustrates various embodiments of a method for smoothing input current to a power delivery system having regeneration capability.

FIG. 5 illustrates various embodiments of a method 30 for smoothing input current to a power delivery system having regeneration capability. According to various embodiments, the method 30 may be utilized to control the power delivery system 10 of FIG. 1. For ease of explanation purposes, the method 30 will be described with reference to the power delivery system 10 of FIG. 1. However, those skilled in the art will appreciate that the method 30 may be utilized for smoothing input current to other power delivery systems. The method 30 sufficiently smoothes the input current to the input converter 20 such that no line reactors are required prior to the input converter 20. In general, to smooth the input current, the above-described window (i.e., the six 60° intervals shown in FIG. 4) may be shifted either forward or backward relative to the voltage waveforms Va, Vb, and Vc.

Figure 6:
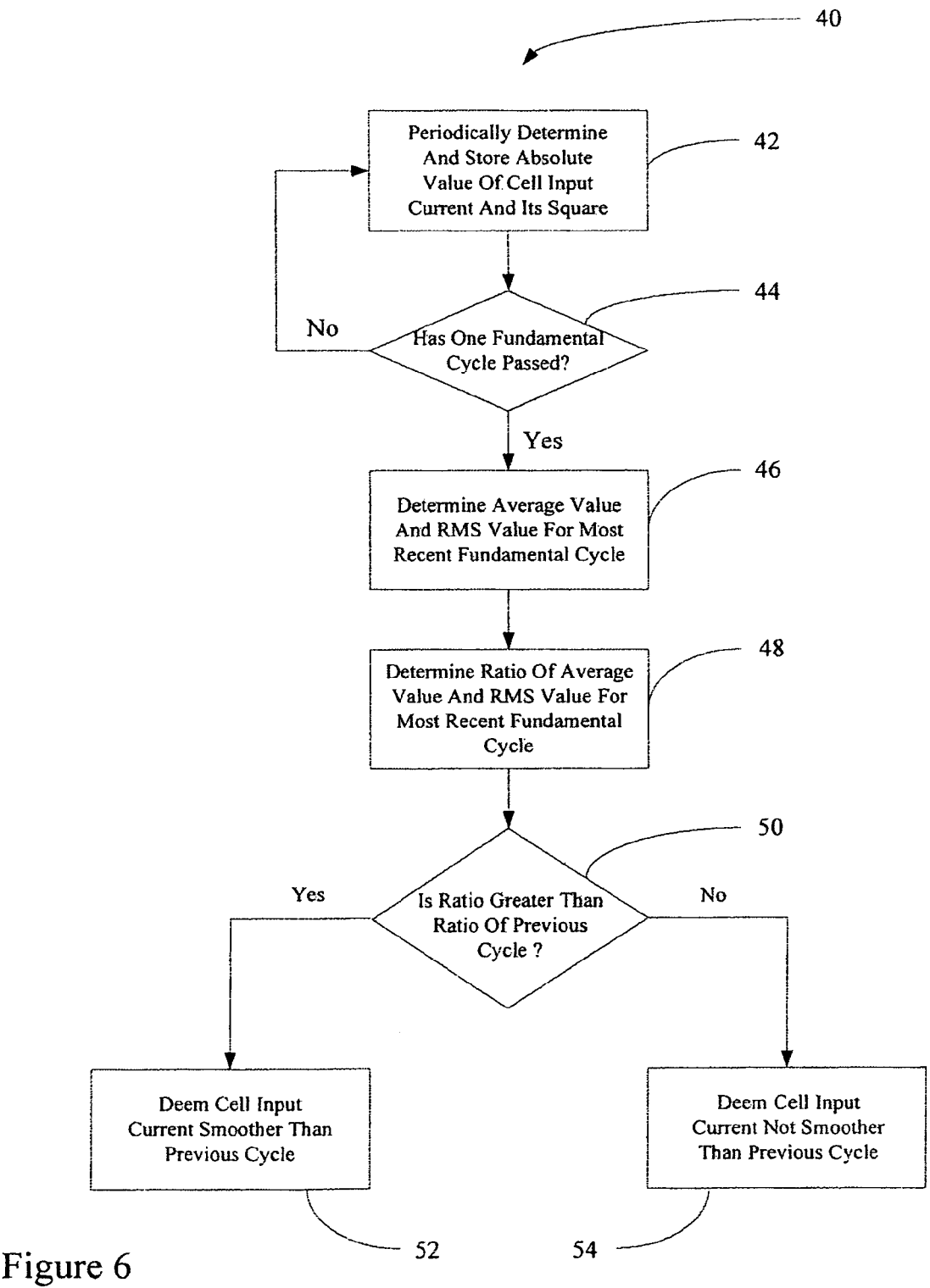
FIG. 6 illustrates various embodiments of a method for evaluating an input current of a power cell.

The method 30 starts at block 32, where the input current to a power cell of the drive is evaluated for a fundamental cycle. The cell input current may be at any suitable frequency (e.g., 60 hertz or 50 hertz). At a frequency of 60 hertz, a fundamental cycle occurs every 1/60 of a second. According to various embodiments, the cell input current may be evaluated for each fundamental cycle of the input frequency. Thus, at a frequency of 60 hertz, the cell input current may be evaluated every 1/60 of a second. Various embodiments of a method for evaluating the cell input current are illustrated in FIG. 6.

From block 32, the process advances to block 34, where it is determined whether or not the cell input current for a given fundamental cycle (e.g., the third fundamental cycle) is smoother than the cell input current for the preceding fundamental cycle (e.g., the second fundamental cycle). According to various embodiments, after the first fundamental cycle, the window is arbitrarily shifted either forward or backward relative to the voltage waveforms Va, Vb, and Vc.

From block 34, the process advances to either block 36 or block 38. If the cell input current for the given fundamental cycle is smoother than the cell input current for the preceding fundamental cycle, the process advances from block 34 to block 36. At block 36, the window is shifted in the same direction that the window was shifted for the preceding fundamental cycle. From block 36, the process returns to block 32, where the process advances as described hereinabove.

If the cell input current for the given fundamental cycle is not smoother than the cell input current for the preceding fundamental cycle, the process advances from block 34 to block 38. At block 38, the window is shifted in the opposite direction that the window was shifted for the preceding fundamental cycle. From block 38, the process returns to block 32, where the process advances as described hereinabove.

The shifting of the window at block 36 or block 38 may affect which switching devices of the input converter 20 are conducting at a given time. For example, at a given angle of voltage Va, switching devices B+ and A− may be conducting, or switching devices C+ and A− may be conducting, depending on the overall amount of the shift. The process described at blocks 32-36 may be repeated for each fundamental cycle, and may be repeated any number of times. According to various embodiments, each shift of the window may be a relatively small shift on the order of approximately one-half of a degree, and the overall range of the shifts may be on the order of approximately four to five degrees.

FIG. 6 illustrates various embodiments of a method 40 for evaluating the cell input current. The process starts at block 42, where the absolute value of the cell input current and its square are determined on a periodic basis. According to various embodiments, the absolute value of the cell input current and its square is determined for each of a plurality of time periods. For example, the absolute value of the cell input current and its square may be determined for each half cycle of the carrier frequency. Thus, for a carrier frequency of 1500 hertz, the absolute value of the cell input current and its square would be determined every 1/3000$^{th}$ of a second. The process described at block 42 may be implemented by a controller and repeated for a full fundamental cycle of the input frequency. Thus, for a carrier frequency of 1500 hertz and an input frequency of 60 hertz, the process described at block 42 would be repeated fifty times during a fundamental cycle. The controller may store the respective values for any number of fundamental cycles.

According to various embodiments (e.g., for a carrier frequency of 1500 hertz and an input frequency of 60 hertz), the controller determines the absolute value of the cell input current and its square for the first $\frac{1}{3000}^{th}$ of a second interval, and stores the determined values. The controller then determines the absolute value of the cell input current and its square for the second $\frac{1}{3000}^{th}$ of a second interval, adds the absolute value for the second interval to the absolute value for the first interval, adds the square for the second interval to the square for the first interval, and stores the respective totals of the absolute values and the squares. The controller then determines the absolute value of the cell input current and its square for the third $\frac{1}{3000}^{th}$ of a second interval, adds the absolute value for the third interval to the sum of the absolute values for the first and second intervals, adds the square for the third interval to the sum of the squares for the first and second intervals, and stores the respective totals of the absolute values and the squares. This process continues for a full fundamental cycle. Thus, at the end of a full fundamental cycle, the stored value for the absolute value of the cell input current is represented by the sum of the fifty absolute values, and the stored value for the square is represented by the sum of the fifty squares.

From block 42, the process advances to block 44, where it is determined whether or not one fundamental cycle has passed. From block 44, the process advances to block 46 or returns to block 42. If one fundamental cycle has not passed, the process returns to block 42, where the process advances as described hereinabove. If one fundamental cycle has passed, the process advances from block 44 to block 46, where an average value of the cell input current and an RMS value of the cell input current are determined for the most recent fundamental cycle. According to various embodiments, the average value of the cell input current may be determined by dividing the stored value for the absolute value of the cell input current (e.g., the sum of the fifty absolute values) by the number of absolute values which were summed together to form the stored value (e.g., fifty). The RMS value of the cell input current may be determined, for example, by the dividing the stored value for the square (e.g., the sum of the fifty squares) by the number of squares which were summed together to form the stored value (e.g., fifty), then taking the square root thereof. The controller may store the respective values for the average value and the RMS value for any number of fundamental cycles.

From block 46, the process advances to block 48, where a ratio of the average value and the RMS value for the most recent fundamental cycle is determined. According to various embodiments, the ratio may be determined by dividing the average value determined at block 46 by the RMS value determined at block 46. The controller may store the ratios for any number of fundamental cycles.

From block 48, the process advances to block 50, where the ratio associated with the most recent fundamental cycle (e.g., the third fundamental cycle) is compared to the ratio associated with the preceding fundamental cycle (e.g., the second fundamental cycle).

From block 50, the process advances to either block 52 or block 54. If the comparison at block 50 determines that the ratio associated with the most recent fundamental cycle is greater than the ratio associated with the preceding fundamental cycle, the process advances from block 50 to block 52, where the cell input current for the most recent fundamental cycle is deemed to be smoother than the cell input current for the preceding fundamental cycle. If the comparison at block 50 determines that the ratio of the most recent fundamental cycle is less than the ratio of the preceding fundamental cycle, the process advances from block 50 to block 54, where the cell input current for the most recent fundamental cycle is deemed not to be smoother than the cell input current for the preceding fundamental cycle. The deeming of the cell input current as smoother/not smoother at blocks 52/54 may provide the basis for the smoother/not smoother determination at block 34 of the method 30 described hereinabove. In general, for two waveforms having the same average value, the waveform having the lower RMS value is less distorted than the waveform having the higher RMS value.

While several embodiments of the invention have been described herein by way of example, those skilled in the art will appreciate that various modifications, alterations, and adaptions to the described embodiments may be realized without departing from the spirit and scope of the invention defined by the appended claims.

What is claimed is:

1. A method for smoothing input current to a power delivery system having regeneration capability, the method comprising:
   evaluating input current to an input converter of the power delivery system for a first fundamental cycle;
   shifting a window relative to a waveform of an input voltage after the first fundamental cycle;
   evaluating input current to the input converter for a second fundamental cycle;
   determining whether the input current of the second fundamental cycle is smoother than the input current of the first fundamental cycle;
   shifting the window in the same direction the window was shifted after the first fundamental cycle if the input current of the second fundamental cycle is smoother than the input current of the first fundamental cycle; and
   shifting the window in the opposite direction the window was shifted after the first fundamental cycle if the input current of the second fundamental cycle is not smoother than the input current of the first fundamental cycle.

2. The method of claim 1, wherein evaluating the input current for the first fundamental cycle comprises:
   determining an average value of the input current over the first fundamental cycle; and
   determining a RMS value of the input current over the first fundamental cycle.

3. The method of claim 2, wherein determining the average value of the input current over the first fundamental cycle comprises:
   determining an absolute value of the input current for each of a plurality of time periods;
   summing the absolute values determined for each of the plurality of time periods; and
   dividing the sum of the absolute values by the number of time periods.

4. The method of claim 3, wherein determining the RMS value of the input current over the first fundamental cycle comprises:
   determining a square of the absolute value of the input current for each of the plurality of time periods;
   summing the squares determined for each of the plurality of time periods;
   dividing the sum of the squares by the number of time periods; and
   determining the square root of:
   the sum of the squares divided by the number of periods.

5. The method of claim 1, wherein shifting the window after the first fundamental cycle comprises shifting the window forward relative to the waveform.

6. The method of claim 1, wherein shifting the window after the first fundamental cycle comprises shifting the window backward relative to the waveform.

7. The method of claim 1, wherein evaluating the input current for the second fundamental cycle comprises:
   determining an average value of the input current over the second fundamental cycle; and
   determining a RMS value of the input current over the second fundamental cycle.

8. The method of claim 7, wherein determining the average value of the input current over the second fundamental cycle comprises:
   determining an absolute value of the input current for each of a plurality of time periods;
   summing the absolute values determined for each of the plurality of time periods; and
   dividing the sum of the absolute values by the number of time periods.

9. The method of claim 8, wherein determining the RMS value of the input current over the second fundamental cycle comprises:
   determining a square of the absolute value of the input current for each of the plurality of time periods;
   summing the squares determined for each of the plurality of time periods;
   dividing the sum of the squares by the number of time periods; and
   determining the square root of:
      the sum of the squares divided by the number of periods.

10. The method of claim 1, wherein determining whether the input current of the second fundamental cycle is smoother than the input current of the first fundamental cycle comprises:
    determining a ratio of an average value of the input current and a RMS value of the input current for the first fundamental cycle;
    determining a ratio of an average value of the input current and a RMS value of the input current for the second fundamental cycle; and
    comparing the ratio for the first fundamental cycle to the ratio for the second fundamental cycle.

11. The method of claim 10, wherein determining the ratio for the first fundamental cycle comprises:
    determining the average value of the input current over the first fundamental cycle; and
    determining the RMS value of the input current over the first fundamental cycle.

12. The method of claim 11, wherein determining the average value comprises:
    determining an absolute value of the input current for each of a plurality of time periods;
    summing the absolute values determined for each of the plurality of time periods; and
    dividing the sum of the absolute values by the number of time periods.

13. The method of claim 12, wherein determining the RMS value comprises:
    determining a square of the absolute value of the input current for each of the plurality of time periods;
    summing the squares determined for each of the plurality of time periods;
    dividing the sum of the squares by the number of time periods; and
    determining the square root of:
       the sum of the squares divided by the number of periods.

14. The method of claim 10, wherein determining the second ratio comprises:
    determining the average value of the input current over the second fundamental cycle; and
    determining the RMS value of the input current over the second fundamental cycle.

15. The method of claim 14, wherein determining the average value comprises:
    determining an absolute value of the input current for each of a plurality of time periods;
    summing the absolute values determined for each of the plurality of time periods; and
    dividing the sum of the absolute values by the number of time periods.

16. The method of claim 15, wherein determining the RMS value comprises:
    determining a square of the absolute value of the input current for each of the plurality of time periods;
    summing the squares determined for each of the plurality of time periods;
    dividing the sum of the squares by the number of time periods; and
    determining the square root of:
       the sum of the squares divided by the number of periods;
    determining a sum of average values over the second cycle; and
    determining a sum of RMS values over the second cycle.

17. The method of claim 10, further comprising deeming the input current smoother if the ratio for the first fundamental cycle is greater than the ratio for the second fundamental cycle.

18. The method of claim 10, further comprising deeming the input current not smoother if the ratio for the first fundamental cycle is less than the ratio for the second fundamental cycle.

19. The method of claim 1, further comprising:
    evaluating input current to the input converter for a third fundamental cycle;
    determining whether the input current of the third fundamental cycle is smoother than the input current of the second fundamental cycle;
    shifting the window in the same direction the window was shifted after the second fundamental cycle if the input current of the third fundamental cycle is smoother than the input current of the second fundamental cycle; and
    shifting the window in the opposite direction the window was shifted after the second fundamental cycle if the input current of the third fundamental cycle is not smoother than the input current of the second fundamental cycle.

* * * * *